United States Patent [19]
Kerchner

[11] Patent Number: 6,129,903
[45] Date of Patent: Oct. 10, 2000

[54] HYDROTHERMAL PROCESS FOR MAKING BARIUM TITANATE POWDERS

[75] Inventor: Jeffrey A. Kerchner, Fleetwood, Pa.

[73] Assignee: Cabot Corportion, Boston, Mass.

[21] Appl. No.: 09/343,978

[22] Filed: Jun. 30, 1999

Related U.S. Application Data

[60] Provisional application No. 60/091,413, Jul. 1, 1998.

[51] Int. Cl.[7] .................................................. C01G 23/00
[52] U.S. Cl. ............................................................. 423/598
[58] Field of Search ....................... 423/598, 71; 501/137

[56] References Cited

U.S. PATENT DOCUMENTS

| | | |
|---|---|---|
| 4,643,984 | 2/1987 | Abe et al. . |
| 4,829,033 | 5/1989 | Menashi et al. . |
| 4,832,939 | 5/1989 | Menashi et al. . |
| 4,863,883 | 9/1989 | Menashi et al. . |
| 4,898,843 | 2/1990 | Matushita et al. . |

FOREIGN PATENT DOCUMENTS

| | | | |
|---|---|---|---|
| 2 208 644 | 4/1989 | United Kingdom . | |
| 83/03819 | 11/1983 | WIPO | 423/598 |

OTHER PUBLICATIONS

Japanese Abstract 3069511, Mar., 1991.
Chemical Abstracts, 78:140144, no date.
C.F. Baes et al., Hydrolysis of Cations, John Wiley & Sons, New York, p. 98–103, 146–161, 1976, no month.
Hertl., Kinetics Barium Titanate Synthesis, J. Am. Ceram. Soc., vol. 71, pp. 879–883 (1988), no month.
H. Kumazawa et al., Preparation of Barium Titanate Ultrafine Particles From Amorphous Titania By A Hydrothermal Method and Specific Dielectric Constants of Sintered Discs of The Prepared Particles, J. Mat. Sci., vol. 31 pp. 2599–2602, 1996, no month.

T.R.N. Kutty et al., Precipitation of Rutile and Anatase ($TiO_2$) Fine Powders and Their Conversion to $MtiO_3$ (M=Ba, Sr,, Ca) by the Hydrothermal Method, Mater. Chem. Phys., vol. 19, pp. 533–46, 1988, no month.

J.B. Lee, Elevated Temperature Potential—pH Diagrams for the $Cr-H_2O$, $Ti-H_2O$, and $Pt-H_2O$ Systems, Corrosion, NACE, vol. 37, p. 467–481 (1981), no month.

J. Moon, Hydrothermal Particle Synthesis of Barium Titanate and Particle Formation Study, Ph.D. Dissertation, The University of Florida, 1996.

M. Pourbaix, Atlas of Electrochemical Equilibria in Aqueous Solutions, second ed., National Association of Corrosion Engineers, Houston, TX, 1974 pp. 146–154, 213–222, and 223–229, no month.

E.B. Slamovich et al., Structural Evolution I Hydrothermally Processed (<100°C) $BaTiO_3$ Films, J. Am. Ceram. Soc. vol. 79, [1], pp. 239–247, 1996.

Wada et al., Preparation of Barium Titanate Fine Particles by Hydrothermal Method and Their Characterization, J of Ceram. Soc. of Japan, vol. 103, 1220–1227, 1995.

*Primary Examiner*—Steven Bos

[57] ABSTRACT

A hydrothermal process for making barium titanate powders. The process utilizes a thawed hydrated titanium oxide gel as a titanium source for the hydrothermal reaction. The process includes mixing the thawed hydrated titanium oxide gel and a barium source in a reaction chamber to form a hydrothermal reaction mixture. The temperature of the hydrothermal reaction mixture in the reaction chamber is increased to a reaction temperature to form a barium titanate particle suspension. The particle suspension is then cooled to room temperature. The resulting barium titanate particles, preferably, have a submicron particle size.

22 Claims, 3 Drawing Sheets

HYDROTHERMAL PROCESS FOR MAKING BARIUM TITANATE POWDERS

RELATED APPLICATIONS

This application claims priority to U.S. provisional application Ser. No. 60/091,413, filed Jul. 1, 1998, entitled "Hydrothermal Process For Making Barium Titanate Powders," the disclosure of which application is incorporated herein by reference.

BACKGROUND OF THE INVENTION

The present invention is directed to a process for making barium titanate and, more particularly, to a hydrothermal process for making barium titanate powders.

Barium titanate has a high dielectric constant, which makes it a useful material in the formation of a multilayer ceramic capacitor ("MLC"). It is widely used in a doped form as the dielectric material in MLC applications. MLC's comprise alternating layers of dielectric and electrical conductor materials. The dielectric layers of an MLC are usually prepared from a high solids dispersion, which typically comprises barium titanate powder and a polymeric binder in an aqueous or non-aqueous solvent. The dispersion, or slip, is cast or coated to provide a "green" layer of ceramic dielectric which are then coated with conductor materials in a pattern and are then stacked to provide a laminate of alternating layers of green ceramic dielectric and conductor. The stacks are diced into MLC-sized cubes which are heated to burn off organic materials, such as binder and dispersant, and are then fired to sinter the particles of barium titanate-based material to form a capacitor structure with laminated, dense ceramic dielectric and conductor layers. During sintering increased ceramic dielectric density is achieved as a result of the fusion and consolidation of the particles to form grains. Even with the use of grain growth inhibitors, ceramic grain size in an MLC dielectric layer is typically larger, for example by a factor of between 3 and 5, than the size of the original primary particles. Moreover, not all porosity is removed during the sintering process. Typically, 2 to 10% porosity remains in MLC dielectric layers. These pores, or hole defects, in the dielectric layer, tend to be larger in larger grain size ceramics. Certain critical capacitor properties, such as break down voltage and DC leakage, are influenced by dielectric thickness, grain size and pore defects. For instance, it is believed that effective dielectric layers need to be several, for example at least 3 to 5, grains thick. Because a defect in any one of the layers of an MLC can be fatal to its performance, MLC's are manufactured with a sufficient thickness of dielectric layer to effectively reduce the impact of ceramic defects which can be caused by random large grains or pores, adversely affect the properties of the MLC.

The miniaturization of electronic components and desire to increase the volumetric efficiency of capacitors has led to the production of dielectric layers of ever-decreasing thickness. As wet casting processes and suspension dispersions have been refined to provide thinner commercial dielectric layers, a smaller particle size dielectric is required with an equiaxed morphology for optimum packing. If the particle diameters approach the magnitude of the dielectric thickness, the voids inherent to the randomly packed layers would represent a large percentage of the total thickness, and may be sufficiently large to produce a short-circuit across the dielectric layer rendering the dielectric layer useless. Subsequently, MLC manufacturers typically use submicron (for example, less than 400 nm) spherical dielectric powders.

Barium titanate powders produced by conventional processes, for example calcination, oxalate-derived, and sol gel-derived methods, may require additional crystallization heat treatments, and/or milling prior to use in forming operations. Improper application of the respective secondary processes may produce an aggregated powder unsuited for use in ultra-thin layers and powder surfaces which exhibit a non-stoichiometric Ba/Ti due to the incongruent dissolution of barium. The large particles, and/or strongly-agglomerated fine particles, formed in these processes may have sizes substantially larger than 1 $\mu$m. These particles and/or agglomerates are not readily amenable to the production of MLC's with fine grained, ultra-thin dielectric layers of less than between about 4–5 $\mu$m.

Hydrothermal processes are known, for example, as disclosed by Menashi et al., in U.S. Pat. No. 4,832,939. Menashi et al. disclose a method of hydrothermally synthesizing stoichiometric, submicron, dispersible doped and undoped barium titanate and dielectric compositions of barium titanate which have very narrow particle size distributions. In one embodiment, barium titanate powder is produced by introducing a solution of 0.5 to 1.0 molar $Ba(OH)_2$ heated to a temperature between 70° C.–90° C., into a vigorously stirred slurry of a high surface area hydrous titania at a temperature ranging between 60° C.–150° C. at a constant rate over a time period of less than five minutes. The introduction of $Ba(OH)_2$ continues until the Ba/Ti mole ratio in the slurry is between 1.1 to 1.3. The slurry is then held at temperature for 10 to 30 minutes so that 95 to 98 percent of the $TiO_2$, is converted to $BaTiO_3$. The slurry is then heated to an elevated temperature, preferably at least 175° C., to ensure complete conversion of the tetravalent hydrous oxide to a stoichiometric perovskite. After cooling to an appropriate temperature, the slurry is pressure filtered to give a cake of stoichiometric $BaTiO_3$ containing 80 to 85 weight percent solids. The product is then washed with either water or a 0.01 to 0.02M $Ba(OH)_2$ solution. The wet cake is then dried resulting in a high purity, stoichiometric barium titanate powder having a primary particle size in the range between 0.05 and 0.4 micron with a very narrow particle size distribution.

Recent hydrothermal studies by Kumazawa et al., "Preparation of barium titanate ultrafine particles from amorphous titania by a hydrothermal method and specific dielectric constants of sintered discs of the prepared particles," Journal of Matl. Science, 1996, pp. 2599–2602 ("Kumazawa"), and Wada et al., "Preparation of Barium Titanate Fine Particles by Hydrothermal Method and Their Characterization," Journal of the Ceramic Society of Japan, 103 [12] 1220–1227 (1995) ("Wada"), employed simple non-injection systems, wherein suspensions of barium hydroxide octahydrate ($Ba(OH)_2 \cdot 8H_2O$) and hydrated titanium oxide gel ($TiO_x(OH)_y$) were introduced into an autoclave at room temperature, sealed to the atmosphere, and ramped up to a final reaction temperature under agitation. In both studies, the particle size was reported to strongly correlate on the precursor Ba/Ti molar ratio. A decrease in the mean particle size was observed with an increase of the precursor Ba/Ti until a critical ratio, $Ba/Ti_{crit}$, was reached after which the particle size remained constant with additional increases of the precursor Ba/Ti. The $Ba/Ti_{crit}$ that resulted from the Kumazawa hydrothermally-derived $BaTiO_3$ powders was about 2.0, in contrast to a $Ba/Ti_{crit}$ of about 20.0 reported by Wada.

SUMMARY OF THE INVENTION

The present invention is directed to a hydrothermal process for making barium titanate particles. The process includes the steps of mixing a thawed hydrated titanium oxide gel and a barium source in a reaction chamber to form a hydrothermal reaction mixture, increasing the temperature of the hydrothermal reaction mixture in the reaction chamber to a reaction temperature to form a suspension of barium titanate particles, and cooling the suspension of barium titanate particles to room temperature.

Among other advantages, the process utilizes a thawed hydrated titanium oxide gel as the titanium source in the hydrothermal reaction which has a low viscosity and, thus, can be pumped into a reaction chamber without further dilution with water. Furthermore, the aqueous phase formed by the phase separation of the thawed hydrated titanium oxide gel serves as the aqueous medium for the hydrothermal reaction so that no additional water is necessary in the reaction mixture. As a result of the absence of diluting steps, higher concentrations of the reactants in the reaction chamber are achievable than in conventional barium titanate hydrothermal processes. The higher reactant concentrations lead to higher yields of barium titanate amongst other advantages. The process readily can be used to produce submicron barium titanate particles and, in some cases, produces barium titanate particles having a particle size of 0.03 microns or lower.

Other advantages, novel features, and aspects of the invention will become apparent from the following detailed description of the invention when considered in conjunction with the accompanying figures, and from the claims.

BRIEF DESCRIPTION OF THE DRAWINGS

The foregoing and other objects and advantages will be more fully appreciated from the following drawings in which.

DETAILED DESCRIPTION OF THE INVENTION

Figure 1:
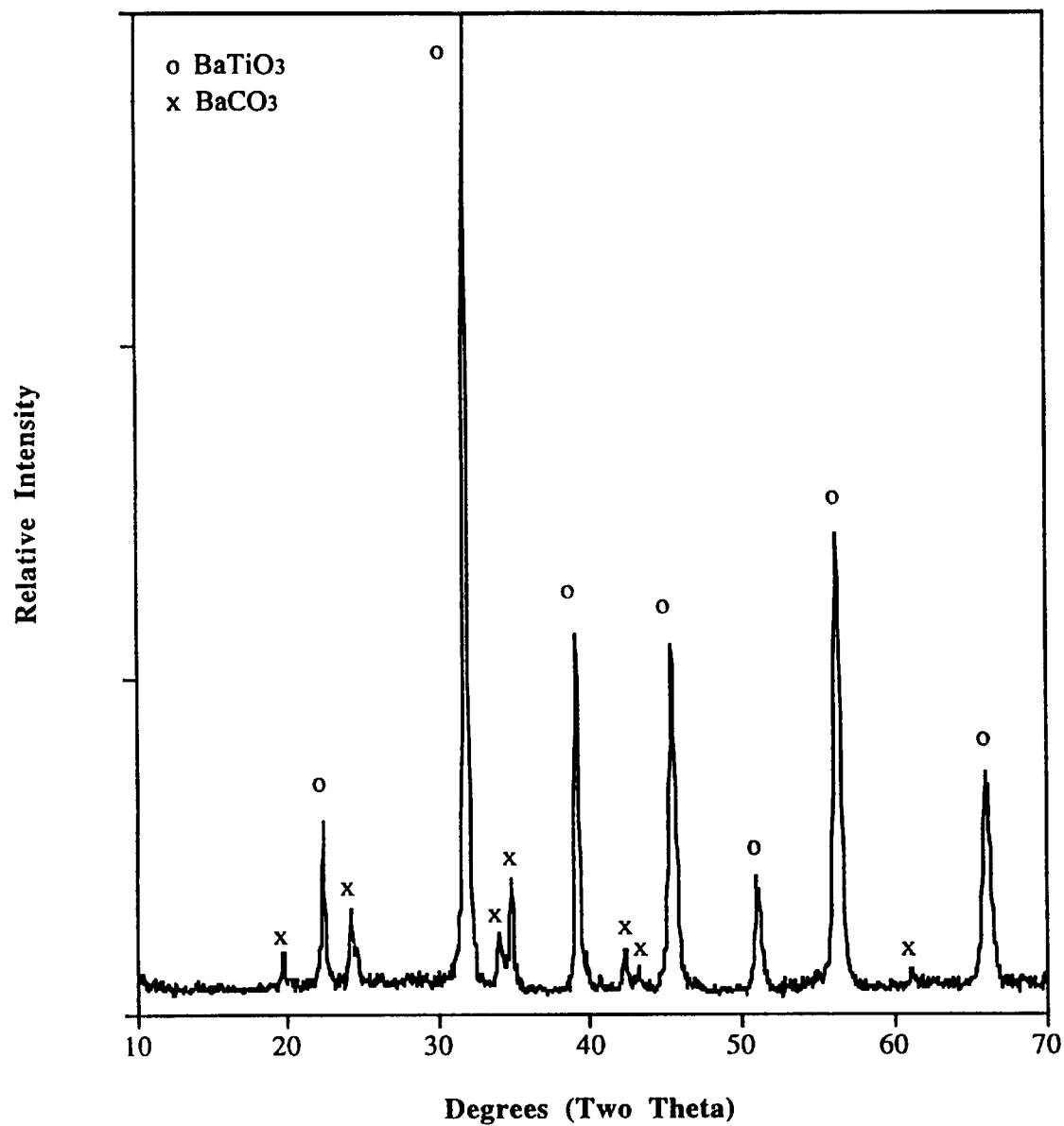
FIG. 1 is a graph of x-ray diffraction of the $BaTiO_3$ powder produced according to Example 1, illustrating a cubic crystalline pattern with $BaCO_3$ contamination.
Figure 2A:
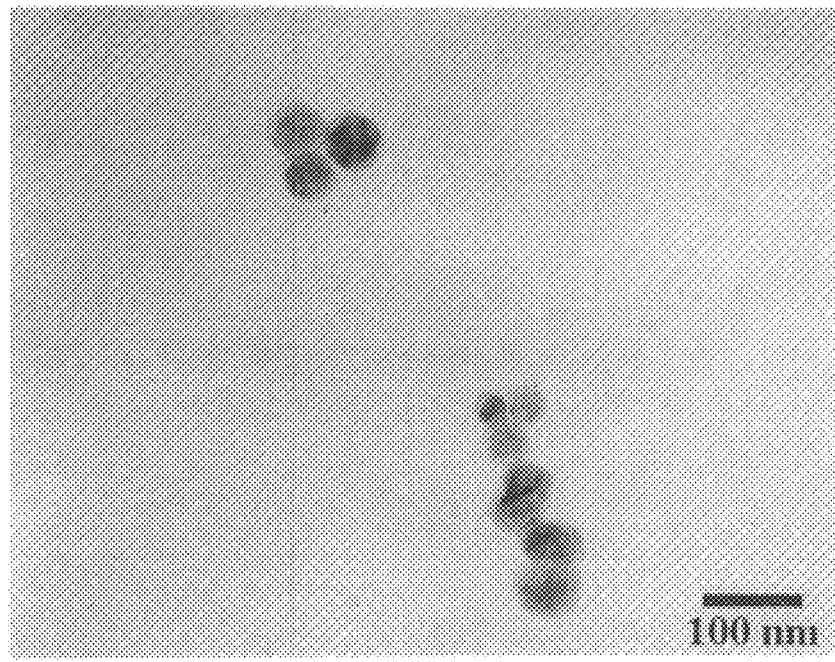
FIG. 2A is a TEM photomicrograph of $BaTiO_3$ powder produced according to Example 1.
Figure 2B:
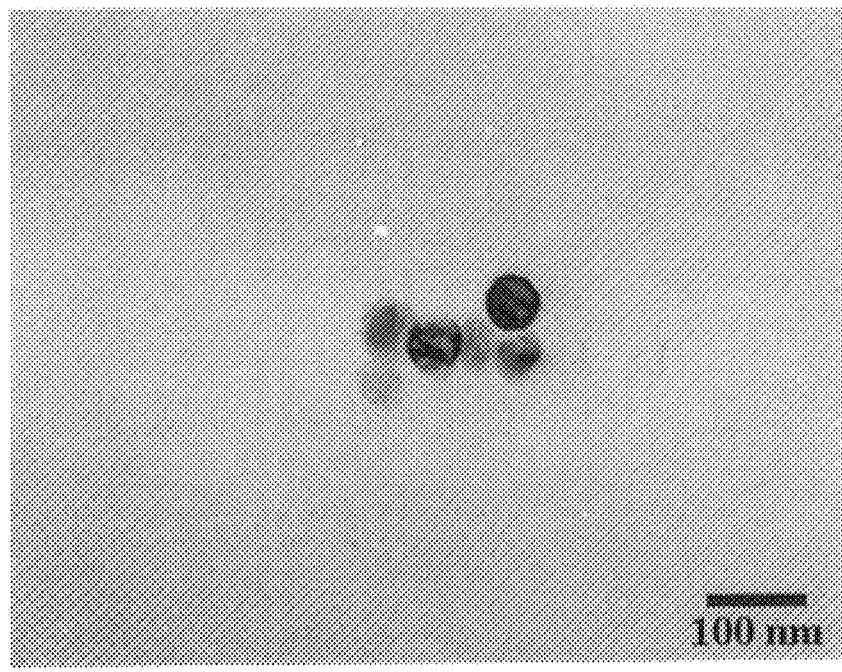
FIG. 2B is a TEM photomicrograph of the $BaTiO_3$ powder produced according to Example 1.
Figure 2C:
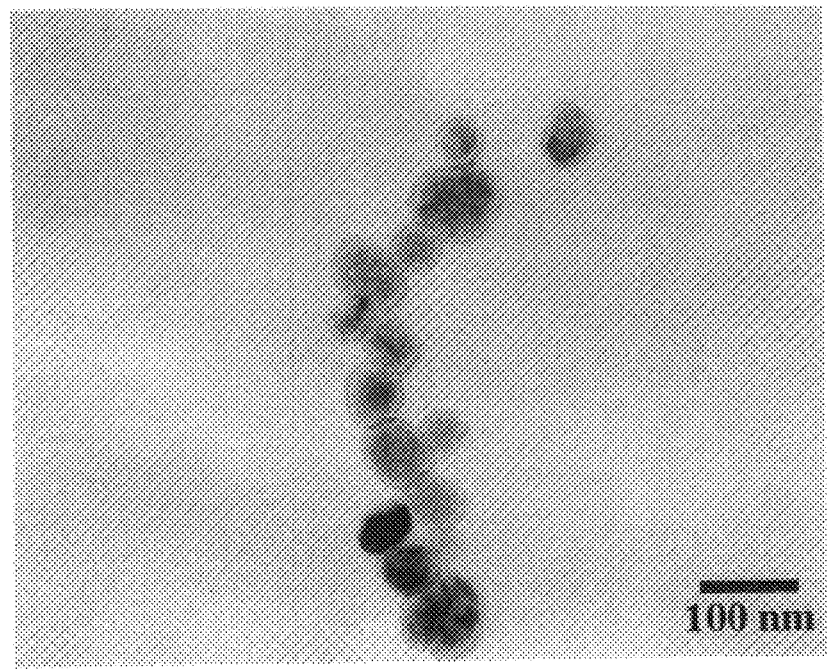
FIG. 2C is a TEM photomicrograph of the $BaTiO_3$ powder produced according to Example 1.
Figure 2D:
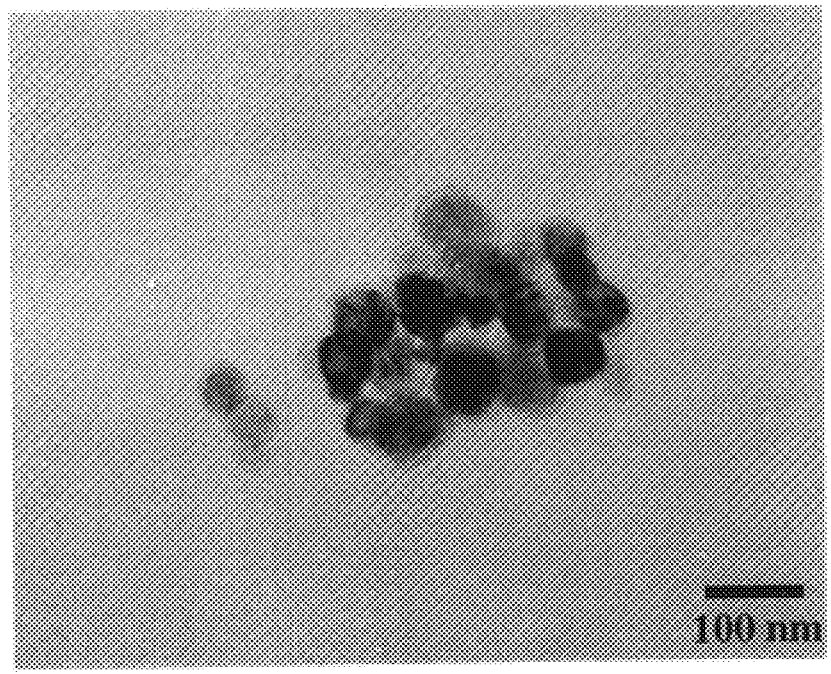
FIG. 2D is a TEM photomicrograph of the $BaTiO_3$ powder produced according to Example 1.

The present invention is directed to a hydrothermal process for making barium titanate powders. The process uses a thawed hydrated titanium oxide gel as the titanium source in the hydrothermal reaction. The thawing process causes the solid and aqueous phases of the gel to separate and, as a result, the thawed gel has a low viscosity which enables the gel to be pumped into a reaction chamber without further dilution with water. In the reaction chamber, the thawed gel is mixed with a barium source, such as barium hydroxide octahydrate ($Ba(OH)_2 \cdot 8H_2O(s)$), with the aqueous phase of the gel providing the liquid medium for the hydrothermal reaction. The mixture is then heated to a reaction temperature to promote a reaction between the titanium source and the barium source to form submicron particles of barium titanate ($BaTiO_3$). The resulting particles are maintained in an aqueous slurry which is typically washed to eliminate excess reactants and cooled to room temperature. The slurry can be further processed by conventional techniques to form dielectric layers in MLC's.

The hydrated titanium oxide gel used as the titanium source in the hydrothermal process is preferably formed from a titanium oxychloride precursor. In one preferred embodiment, the precursor has a pH of approximately 1 and includes titanium oxychloride ($TiOCl_2$), hydrochloric acid (HCl), and water. The precursor may include 35–36 weight percent $TiOCl_2$, 19 weight percent HCl, and 45–46 weight percent water. A solution of water and ammonium hydroxide ($NH_4OH$) may be added to the titanium oxychloride precursor to increase the pH to approximately 3–4 to precipitate hydrated titanium oxide gel in the solution. The gel may be recovered from the solution and washed with hot water to remove residual ammonium chloride which is a by-product of the reaction that forms the gel. Excess water remaining from the wash step may be removed from the gel, for example, through the action of a vacuum. The resulting gel structure includes a solid $TiO_2$ phase, of about 4 weight percent, distributed in a solid network and the balance of an aqueous phase. In this form, the hydrated titanium oxide gel typically has a homogenous consistency and a high viscosity which prevents pumping the gel into the reaction chamber through feed lines unless the gel is diluted, for example with water, to reduce its viscosity.

The temperature of the resulting hydrated titanium oxide gel is decreased to below 0° C., for example in a freezer, to freeze the aqueous phase of the gel. After the freezing step, the temperature of the gel is then increased, for example by returning the gel to ambient conditions, to melt the frozen aqueous phase, thereby forming a thawed hydrated titanium oxide gel. The thawing process changes the physical characteristics of the hydrated titanium oxide gel. That is, the thawed gel has a different structure than the gel prior to the freezing process. The thawing process causes the solid and aqueous phases of the gel to separate and the solid phase, having a higher density than water, settles in the aqueous phase. The solid phase may then be slurried in the aqueous phase to form a slurry having a low viscosity. The thawed gel in slurry form is added to the reaction chamber as the titanium source for the hydrothermal reaction. The thawed gel may be advantageously pumped to the reaction chamber through feed lines due to its low viscosity without the need to further dilute the gel with water as is conventionally done when using a non-thawed hydrated titanium oxide gel.

In the reaction chamber, a barium source is added to the thawed hydrated titanium oxide gel, preferably in the form of a solid, such as $Ba(OH)_2 \cdot 8H_2O(s)$, to form a reaction mixture. The aqueous phase of the gel provides the aqueous reaction medium for the mixture. In these embodiments, typically it is unnecessary to add additional water to the reaction mixture, which would reduce the concentration of the barium and titanium sources. As a result, it is possible to achieve high concentrations of the reactants in the reaction chamber, which, as described further below, leads to higher yields of barium titanate per reaction batch and other advantages. Typically when the barium source is added as a solid, the reaction chamber and the titanium source therein are maintained at room temperature and subsequent heating dissolves the $Ba(OH)_2 \cdot 8H_2O(s)$ in the reaction medium. As known to those skilled in the art, "room temperature" generally means a temperature of between about 20° C. and about 25° C. (between about 68° F. and about 77° F.).

In other embodiments, the barium source may be added to the reaction chamber as a barium hydroxide solution, particularly when contamination of the barium source is of a concern. Typically, in these embodiments, the barium hydroxide solution is heated, for example, to a temperature of about 95° C., and then filtered to remove solid contamination such as barium carbonate ($BaCO_3$). The barium hydroxide solution may then be filtered while being pumped into the chamber. In these embodiments, because the barium source is diluted with water the yields generally are not as high as when $Ba(OH)_2.8H_2O(s)$ is used as the barium source, as described above.

Generally, the barium source is added to the reaction chamber in amounts so that the ratio of Ba/Ti in the reaction mixture is slightly greater than 1 to drive the subsequent hydrothermal reaction to completion. When barium hydroxide solution is used in the process, it is added in amounts so that the Ba/Ti ratio in the reaction mixture typically is at least about 1.2 to adequately drive the reaction. When $Ba(OH)_2.8H_2O(s)$ is used in the process, it generally is possible to add lower relative amounts of the barium source. For example, in these cases the resulting Ba/Ti ratio can be less than 1.2, such as 1.1 or less. In these cases, the higher concentration of barium in the reaction mixture can drive the reaction sufficiently though the amount of barium source added is lower. Thus, using $Ba(OH)_2.8H_2O(s)$ can lead to cost savings associated with the barium source.

The addition of the barium source increases the pH of the reaction mixture. Generally, the reaction mixture after the addition of the barium source has a pH of about 13 which is sufficiently high to promote the reaction. This is advantageous due to the increased solubility of the thawed hydrated titanium oxide gel with increased solution alkalinity. Use of $Ba(OH)_2.8H_2O(s)$ as the barium source without dilution with water, as described above, provides for a higher pH and is believed to enhance the hydrothermal reaction.

It is possible to further increase the pH of the reaction mixture, if desired, by the addition of further species to the reaction mixture; however in many cases this leads to disadvantages and is unnecessary. For example, elevating the solution pH by introducing either inorganic or organic bases other than barium hydroxide is possible but may require the controlled removal of residual species during the co-firing of MLC components. The addition of alkali metal hydroxides, such as potassium and sodium hydroxide, as mineralizers is undesirable, since the inherent residual alkali within the $BaTiO_3$ product increases the dielectric loss beyond tolerated dielectric classification limits and may cause exaggerated grain growth. Solution pH adjustment via other alkaline earth hydroxides is limited since all Group IIA elements, with the exception of strontium, are fairly insoluble in aqueous solution and thus would have no effect on the pH. Elevating the pH by increasing the barium concentration with other barium salts is also limited. Several undesirable factors include the limited solubility of the salts, toxic nature of the gaseous byproducts on firing, $BaTiO_3$ dedensification on sintering caused by high temperature decompositions, significant grain growth, adverse effects of residuals on dielectric performance, and precursor cost with respect to barium hydroxide.

After the addition of the barium source, the reaction mixture is then heated within the reaction chamber. The reaction mixture is typically heated to a reaction temperature between about 120° C. and about 220° C., and preferably about 200° C., to promote the hydrothermal reaction. During the heating, the reaction mixture is preferably stirred to ensure that the reactants are distributed homogeneously throughout the mixture. In some cases, the temperature may be ramped at a pre-determined rate until reaching the reaction temperature. Preferred rates depend upon system parameters such as the size of the reaction chamber. The reaction mixture may then be maintained at the reaction temperature for a period of time until the reaction is completed which generally occurs when the titanium source is exhausted. The reaction time typically depends upon a number of factors including the reaction temperature and the concentration of the reactants.

The hydrothermal reaction produces high purity submicron barium titanate particles. The yields of barium titanate produced according to the process of the invention using thawed hydrated titanium oxide gel as the titanium source are typically considerably greater than yields of conventional hydrothermal processes. The phase separation in the gel, as described above, permits the hydrothermal reaction to occur without the further addition of water to the reaction mixture. As a result, the concentration of the reactants (barium source and titanium source) in the reaction chamber can be increased because of the absence of the water and, thus, an increase in reaction product is achieved. For example, yields of barium titanate per reaction batch have been increased by up to about 2.7 times over conventional hydrothermal processes which employ titanium sources diluted with water.

Preferably, the barium titanate particles produced in the hydrothermal reaction have a particle size of less than about 0.1 micron. In embodiments in which $Ba(OH)_2.8H_2O(s)$ is added to the thawed hydrated titanium oxide gel, without any further addition of water to the reaction mixture, barium titanate particles having ultra fine particle sizes of less than 0.05 microns and, in some cases on the order of 0.03 micron or less, can be produced. In these embodiments, the high reactant concentration increases the nucleation rate of the particles which results in the production of a greater number of particles which have a smaller particle size. The particles produced according to hydrothermal process of the invention are typically spherical and have an equiaxed morphology; further, the particles produced typically exhibit pseudo-cubic crystallinity.

After the reaction, the particles may be maintained in the aqueous slurry which also includes any unreacted barium from the hydrothermal mixture in the form of barium hydroxide. The slurry may then be cooled to room temperature and, typically, washed with buffered water to remove any unreacted barium.

When $Ba(OH)_2.8H_2O(s)$ is used as a barium source, in some cases, barium carbonate may be present as a contaminant in the slurry of the final reaction product. The barium carbonate is generally in particle form having a particle size of greater than about 1 micron. In some cases, it is preferable to remove barium carbonate contamination because its presence in a dielectric layer in an MLC may lead to a decrease in the dielectric constant and, due to its particle size, it can be deleterious in the production of thin dielectric layers having a thickness of $\leq 3$ μm. The barium carbonate contaminants may be eliminated by a post-hydrothermal process filtration step. For example, the slurry of the reaction product may be passed through a filter having a mesh size designed to retain the barium carbonate particles while allowing the smaller, submicron barium titanate particles to pass through. The resulting barium titanate slurry may be free of barium carbonate contamination.

The slurry of barium titanate particles may be further processed as known in the art to produce a desired final product. For example, the particles may be maintained in a slurry and subjected to a coating process which precipitates thin, metal oxide dopant layers on the particles. In some embodiments, additives such as dispersants and binders may be added to the slurry to form a castable slip. In some embodiments, a portion of the aqueous phase is eliminated from the slurry to form a wet cake. In other embodiments, when desired the particles may be recovered from the slurry and dried. Ultimately, the barium titanate particles are used in the formation of dielectric layers in MLC's.

The present invention will be further illustrated by the following example, which is intended to be illustrative in nature and is not to be considered as limiting the scope of the invention.

EXAMPLE

To determine the effectiveness of the hydrothermal process of the present invention, barium titanate particles were produced in a hydrothermal reaction using a thawed hydrated titanium oxide gel and $Ba(OH)_2 \cdot 8H_2O(s)$.

An amorphous hydrated titanium oxide gel was used as the titanium precursor. The titanium oxide gel exhibited a high, as-synthesized specific surface area, $\geq 200$ m$^2$/g (available from Cabot Performance Materials, Boyertown, Pa.). Previous experimentation has shown $BaTiO_3$ powder inconsistencies when using gel synthesized more than one week prior to use in the synthesis of $BaTiO_3$ powders. The deleterious room temperature aging effect is akin to the Ostwald ripening of an extremely fine colloidal system. Only one gel lot was used to avoid drawing conclusions based on gel lot inconsistencies. The aging problem was avoided by freezing the titanium oxide gel in 100 ml aliquots.

On thawing, a phase separation which occurred during freezing was apparent. The once homogeneous gel (of bread dough or paste-like consistency) separated into solid and liquid portions, yet retained a high surface area of about 240 m$^2$/g.

The thawed titanium gel and $Ba(OH)_2 \cdot 8H_2O(s)$ were directly weighed into a titanium reaction vessel, placed in an autoclave, purged with nitrogen, sealed to the atmosphere, ramped at approximately 1.4° C./min to the final reaction temperature of 200° C., and soaked for 20 minutes. The autoclave reaction was performed under mechanical agitation at 350 rpm. The powder suspension was then cooled to room temperature after which the powder suspension was washed with pH 10.7 ammoniated water and stored in NALGENE™ containers. The wash solution pH was adjusted to avoid incongruent dissolution of barium from the $BaTiO_3$ surface. The barium titanate powder batch consisted of a 1.03 M barium concentration and retained a precursor Ba/Ti of 1.2.

$BaTiO_3$ samples for X-ray diffraction (XRD) analysis were prepared by placing powder from the aqueous-washed suspension onto an amorphous silica slide and drying the samples in a vacuum oven at 80° C. Phase purity XRD analysis was performed from 10°–90° 2θ using CuKα radiation using a Philips Powder Diffractometer, Model APD 3720 system and generator (Mount Vernon, N.Y.) at 40 kV and 20 mA in combination with a Philips automated diffraction software PW1877, version 3.6g.

Transmission electron microscopy (TEM) samples were prepared by dispersion of approximately 0.01 g of vacuum dried $BaTiO_3$ powder in 12 ml of isopropanol by sonication. Carbon coated Cu grids were vertically dipped into the suspension and stored under vacuum prior to TEM analysis. TEM analysis was performed at 200 kV on a Jeol 200cx TEM (Boston, Mass.).

The measurement of specific surface area was performed by conventional nitrogen adsorption/desorption by the BET technique on a Quantachrome Autosorb-6 Sorption System (Boca Raton, Fla.). Arid conditions were ensured by out gassing the powder in a 6 ml amorphous $SiO_2$ BET cell for $\geq 8$ hours at 160° C. under a 400 mtorr vacuum. The ascertained specific surface area is based on the linear regression of a five-point analysis.

XRD, as shown in FIG. 1, illustrates a cubic $BaTiO_3$ crystalline pattern. A slight amount of $BaCO_3$ contamination was noted. Carbonate is a major contaminant in the $Ba(OH)_2 \cdot 8H_2O(s)$ precursor and is specified by the supplier to be present in concentrations of less than about 0.51 percent, by weight. However, improper handling and exposure to the atmosphere may increase carbonate concentration significantly. When the hydroxide is dissolved into solution as in the injection process, the insoluble barium carbonate remains in the solid state and is removed prior to $BaTiO_3$ synthesis by an in-line filter. Thus some carbonate contamination was anticipated since the as-received $Ba(OH)_2 \cdot 8H_2O$ (s) was introduced directly to the autoclave without dissolution and filtration. The high concentration of barium in solution also promotes the formation of carbonate from atmospheric sources. Thus powder contamination might also be attributed to the carbon dioxide present in the as received titanium oxide gel, incomplete $N_2$ purging of the autoclave, or reaction of the excess barium hydroxide with atmospheric $CO_2$ on exposure during the washing and dewatering processes. Due to the rapid nature of the reactive precipitation process and the inability to seed $BaTiO_3$ with high concentrations of $BaTiO_3$ particles, the barium titanate product attributes are expected to be consistent whether carbonate is absent or present in the system.

The powder batch exhibited distinct, spherical polycrystalline particles and a near monosized distribution. The powders exhibit diameters between 30–90 nm, an approximate average of 50 nm by visual inspection, and an equiaxed morphology, as shown in the TEM photomicrographs of FIGS. 2A–2D.

The specific surface area of the first powder batch was 15.2 m$^2$/g. A C constant of 52.1 was calculated, thereby signifying reliable data from near monolayer surface coverage by nitrogen. The corresponding particle size, assuming ideal spheres of 6.0 g/cm$^3$, is 65 nm. This corroborates the visual observation via TEM.

This Example, therefore, illustrates the effectiveness of using a thawed hydrated titanium oxide gel and $Ba(OH)_2 \cdot 8H_2O(s)$ in a hydrothermal process of the present invention to produce fine barium titanate particles.

Although particular embodiments of the invention have been described in detail for purposes of illustration, various changes and modifications may be made without departing from the scope and spirit of the invention. Accordingly, the invention is not to be limited except as by the appended claims.

What is claimed is:

1. A hydrothermal process of making bariium titanate comprising:
   mixing a thawed hydrated titanium oxide gel and a barium source in a reaction chamber to form a hydrothermal reaction mixture;
   increasing the temperature of the hydrothermal reaction mixture in the reaction chamber to a reaction temperature to form a suspension of barium titanate particles; and
   cooling the suspension of barium titanate particles to room temperature.

2. The hydrothermal process of claim 1, wherein the thawed hydrated titanium oxide gel comprises an aqueous phase separated from a solid phase.

3. The hydrothermal process of claim 2, wherein a liquid phase of the hydrothermal reaction mixture consists essentially of the aqueous phase.

4. The hydrothermal process of claim 1, further comprising pumping the thawed hydrated titanium oxide gel into the reaction chamber prior to mixing the thawed hydrated titanium oxide gel and the barium source.

5. The hydrothermal process of claim 1, wherein the barium source comprises $Ba(OH)_2 \cdot 8H_2O(s)$.

6. The hydrothermal process of claim 5, further comprising adding the barium source to the reaction chamber at room temperature prior to mixing the thawed hydrated titanium oxide gel and the barium source.

7. The hydrothermal process of claim 1, wherein the barium source comprises a barium hydroxide solution heated to a temperature above room temperature.

8. The hydrothermal process of claim 7, further comprising filtering the barium source while introducing the barium source into the chamber.

9. The hydrothermal process of claim 1, wherein the temperature of the hydrothermal reaction mixture is increased at a rate of 1.4° C./min.

10. The hydrothermal process of claim 1, wherein the reaction temperature is between about 120° C. and about 220° C.

11. The hydrothermal process of claim 10, wherein the reaction temperature is about 200° C.

12. The hydrothermal process of claim 1, further comprising maintaining the hydrothermal reaction mixture at the reaction temperature until the reaction is completed.

13. The hydrothermal process of claim 1, wherein the hydrothermal reaction mixture has a Ba/Ti ratio of about 1.2.

14. The hydrothermal process of claim 1, wherein the hydrothermal reaction mixture has a Ba/Ti ratio of less than about 1.2.

15. The hydrothermal process of claim 1, wherein the barium titanate particles in the suspension are submicron sized.

16. The hydrothermal process of claim 15, wherein the barium titanate particle size is less than about 0.1 micron.

17. The hydrothermal process of claim 16, wherein the barium titanate particle size is less than about 0.05 micron.

18. The hydrothermal process of claim 1, further comprising washing the suspension of barium titanate particles.

19. The hydrothermal process of claim 1, further comprising filtering the suspension of barium titanate particles.

20. The hydrothermal process of claim 1, further comprising precipitating a dopant layer onto the barium titanate particles.

21. The hydrothermal process of claim 1, further comprising adding a dispersant and a binder to the suspension of barium titanate particles to form a slip.

22. The hydrothermal process of claim 1, further comprising drying the barium titanate particles.

\* \* \* \* \*